(12) United States Patent
Kelly et al.

(10) Patent No.: US 10,733,394 B2
(45) Date of Patent: Aug. 4, 2020

(54) SMART ENERGY SCAVENGING TAG SENSOR

(71) Applicant: INTERMEC IP CORP., Everett, WA (US)

(72) Inventors: Stephen J. Kelly, Marion, IA (US); Pavel Nikitin, Seattle, WA (US)

(73) Assignee: INTERMEC IP CORP., Everett, WA (US)

( * ) Notice: Subject to any disclaimer, the term of this patent is extended or adjusted under 35 U.S.C. 154(b) by 973 days.

(21) Appl. No.: 14/587,798

(22) Filed: Dec. 31, 2014

(65) Prior Publication Data
US 2016/0188920 A1  Jun. 30, 2016

(51) Int. Cl.
G06K 7/10 (2006.01)
G06K 19/07 (2006.01)

(52) U.S. Cl.
CPC ..... *G06K 7/10158* (2013.01); *G06K 7/10217* (2013.01); *G06K 19/0711* (2013.01); *G06K 19/0723* (2013.01)

(58) Field of Classification Search
CPC ........... G06K 7/10158; G06K 19/0723; G06K 19/0711; G06K 7/10217; G06K 7/08; G06K 7/10198; G06K 7/10316; G06K 7/10366

See application file for complete search history.

(56) References Cited

U.S. PATENT DOCUMENTS

| | | | | |
|---|---|---|---|---|
| 4,656,463 A * | 4/1987 | Anders | ................... | G01S 13/78 340/10.34 |
| 4,827,395 A * | 5/1989 | Anders | ................... | G01S 13/78 340/10.1 |
| 5,300,875 A * | 4/1994 | Tuttle | .................. | H04M 1/0262 320/138 |
| 6,615,074 B2 * | 9/2003 | Mickle | ................. | G06K 7/0008 128/903 |
| 7,009,496 B2 * | 3/2006 | Arneson | ................ | G06Q 10/08 235/377 |
| 7,400,253 B2 | 7/2008 | Cohen | | |
| 7,724,145 B2 | 5/2010 | Batra et al. | | |

(Continued)

FOREIGN PATENT DOCUMENTS

| CN | 201465157 U | 5/2010 |
|---|---|---|
| GB | 2410866 | 8/2005 |

(Continued)

OTHER PUBLICATIONS

Le et al; "Efficient Far-Field Radio Frequency Energy Harvesting for Passively Powered Sensor Networks," IEEE Journal of Solid-State Circuits; May 2008; vol. 43; No. 5; pp. 1287-1302.

(Continued)

*Primary Examiner* — Brian E Miller (74) *Attorney, Agent, or Firm* — Alston & Bird LLP (57) ABSTRACT

A smart tag reading system is provided that has the ability to query sensor tags that have energy harvesting capability. In one embodiment, an adaptive reader system learns the state of each tag and how long the tag takes to charge. Tags that charge relatively quickly can be accessed more frequently. Others that do not charge as quickly, readings can be performed at much longer intervals allowing the tag a longer time to gather enough energy to complete the transaction. The reader query system can then adapt to the environment and state of the individual tags.

11 Claims, 4 Drawing Sheets

(56) References Cited

U.S. PATENT DOCUMENTS

| | | | |
|---|---|---|---|
| 7,844,505 B1* | 11/2010 | Arneson | G06Q 10/087 |
| | | | 340/10.2 |
| 8,035,335 B2 | 10/2011 | Duron et al. | |
| 8,400,297 B2* | 3/2013 | Tuttle | G06K 7/0008 |
| | | | 340/10.33 |
| 8,588,686 B2* | 11/2013 | Rofougaran | H04B 5/0037 |
| | | | 257/679 |
| 8,621,245 B2 | 12/2013 | Shearer et al. | |
| 9,179,492 B2* | 11/2015 | Meier | H04W 80/00 |
| 10,078,127 B2* | 9/2018 | Pirc | G01S 5/0221 |
| 10,098,000 B2* | 10/2018 | Fan | H04L 63/0492 |
| 10,582,359 B2* | 3/2020 | Arneson | H04W 12/009 |
| 2007/0096876 A1 | 5/2007 | Bridgelall et al. | |
| 2008/0111661 A1* | 5/2008 | Lin | G06K 7/0008 |
| | | | 340/10.1 |
| 2009/0128300 A1* | 5/2009 | Lake | G08B 13/1427 |
| | | | 340/10.3 |
| 2013/0059536 A1* | 3/2013 | Froech | H04B 13/005 |
| | | | 455/41.1 |
| 2014/0184910 A1* | 7/2014 | Bailey | H04N 21/4108 |
| | | | 348/554 |

FOREIGN PATENT DOCUMENTS

| | | |
|---|---|---|
| GB | 2520408 A | 5/2015 |
| WO | 2009/095409 A1 | 8/2009 |

OTHER PUBLICATIONS

Ostaffe; "RF-based Wireless Charging and Energy Harvesting Enables New Applications and Improves Product Design;" RF-based Wireless Charging and Energy Harvesting; http://www.mouser.com/rf_energy_harvesting.

Parks et al; "A Wireless Sensing Platform Utilizing Ambient RF Energy;" IEEE Topical Meeting on Wireless Sensors and Sensor Networks (WiSNET); 2013; pp. 154-156.

Apr. 29, 2016 Office Action issued in British Patent Application No. 1521855.5.

Apr. 11, 2018 Examination Report issued in British Patent Application No. 1521855.5.

Jan. 31, 2019 Examination Report issued in British Application No. 1521855.5.

* cited by examiner

SMART ENERGY SCAVENGING TAG SENSOR

BACKGROUND

RFID is a technology that allows a wide range of objects to be identified, tracked and managed. RFID technology is based on the use of small radio tags or transponders and readers/encoders for connection to an information system. These RFID tags, which contain a unique code together with other additional information, can be read by the reader/encoder from a distance without contact or line-of-sight. Typical RFID tags are categorized as either active or passive.

Active RFID tags are typically powered by an internal battery and may include read/write functionality (i.e., tag data can be rewritten and/or modified). An active RFID tag's memory size may vary according to application requirements. In a typical active RFID system, the RFID tag might periodically transmit its data, including a part number and location to a central tracking database. The battery-supplied power of an active tag generally gives it a longer read range than a passive RFID tag. However, active RFID tags result in greater size, greater cost, and an operational life limited to about 10 years depending on operating temperatures and battery type, as compared to passive RFID tags. Additionally, active RFID tags are typically not suitable for indoor use, due to limitations and inherent unreliability of using traditional received signal strength indicators (RSSI) and time distance of arrival (TDOA) calculations.

Passive RFID tags operate without an internal power source. The passive RFID tags obtain operating power from the electromagnetic transmissions generated by the reader. Consequently, passive tags may be much lighter than active tags, less expensive, and offer a virtually unlimited operational lifetime. Passive tags are typically read-only and are programmed with a unique set of data that cannot be modified. However, passive tags may also be read/write tags that are initially programmed with a unique set of data and such data may be modified and updated at desired intervals. In order to operate, the passive tag reader must initiate the communication to the tag, and the tag then responds with its identifier. Typically, to obtain the location of the passive tag, the reader may use a combination of previous known location of the tag, RSSI and TDOA between the tag and reader, triangulation antenna gain measurement. Thus, passive RFID tags generally result in more accurate location of the tags as compared to active tags. Although cheaper and smaller than active tags, passive tags have shorter read ranges than active tags and require a higher-powered reader.

The advantage of RFID systems is the non-contact, non-line-of-sight nature of the technology. Tags can be read through a variety of substances, including metal, where barcodes or other, traditional optically read technologies would be impractical.

However, one disadvantage of RFID technology is that the tags need either a battery or need to be powered by the RFID reader in order to send the data stored therein. Batteries have limited life and must be recharged. There a variety of devices for recharging the on-board tag power storage, including capacitors, super capacitors, and rechargeable batteries. However, depending on the source used for powering the tag and the particular position and orientation of the tag, it may take different lengths of time for the tag to recharge and be ready to respond to the reader. Furthermore, each time a reader connects with a tag, the tag will require power to listen and respond, if needed, and thus using the internal power of the tag. Such a reader does not know how often it should talk to all those different sensor tags installed at different locations and the reader typically does not know the power state of the tag. A simple reader would be relegated to reading the tags only when all of the tags had charged up adequately to respond. The reader would not know the state of the tag so it would be set arbitrarily long to maximize opportunity to hear a given response. When this occurs, information from other tags that normally could be heard would possibly be lost. The read time could also potentially still be too short, but the simple reader would not know this and would fail to access the weak tag(s).

SUMMARY

Embodiments of the present application relate to a smart tag reading system that has the ability to query sensor tags that have energy harvesting capability. In one embodiment, an adaptive reader system learns the state of each tag and how long the tag takes to charge. Tags that charge relatively quickly can be accessed more frequently. Others that do not charge as quickly, readings can be performed at much longer intervals allowing the tag a long time to gather enough energy to complete the transaction. The reader query system can then adapt to the environment and state of the individual tags.

In accordance with one embodiment, an RFID reader may include an antenna that sends interrogation signals to an RFID tag at first time intervals, wherein the RFID tag harvests energy from a source other than the RFID reader. The RFID reader includes a controller that identifies responses received from the RFID tag in response to the interrogation signals sent to the RFID tag. In response to a determination that the RFID tag did not respond to at least one of the interrogation signals, the controller decreases the first time interval to a second time interval. The controller also sets an interrogation signal interval of the RFID reader to the second time interval so that the antenna the interrogation signals are sent at the second time intervals.

In accordance with one embodiment, an RFID reader may include an antenna that sends interrogation signals to an RFID tag at first time intervals, wherein the RFID tag harvests energy from a source other than the RFID reader. The RFID reader includes a controller that identifies responses received from the RFID tag in response to the interrogation signals sent to the RFID tag. In response to a determination that the RFID tag responded to all of the interrogation signals, the controller increases the first time interval to a second time interval. The controller then sets an interrogation signal interval of the RFID reader to the second time interval so that the antenna the interrogation signals are sent at the second time intervals.

In accordance with one embodiment, a system may include an RFID reader and an RFID tag. The RFID reader may include a first ultrasonic transducer to output an ultrasonic wave, and an antenna to transmit a low power RF signal. The RFID tag may include a second ultrasonic transducer to receive the ultrasonic wave which powers the RFID tag, and an antenna to produce backscatter in response to receiving the low power RF signal while the RFID tag is powered using the ultrasonic wave.

DETAILED DESCRIPTION

Smart RFID tag systems according to the present application may have various capabilities, including sensors and security. Smart RFID tags may need to be powered remotely for sensors and microcontroller operation as well longer read ranges. To power the tags, the tags may harvest energy from various energy sources.

Harvesting energy for the tags from a remote energy source may be advantageous because the tags no longer depend on internal batteries with limited lifetime. Various energy sources can include RF signals from TV/radio/cell/WiFi towers/access points, thermal, solar, and vibration.

Embodiments herein provide a smart tag reading system that can query sensor tags that have energy harvesting capability. The tag range is increased by its ability to gather energy from the environment. The tags can be powered by harvesting energy from any energy sources (e.g., TV/radio/cell/WiFi towers/access points, etc.). However, the act of accessing the tag drains energy from the tag. If this energy is stored in a capacitor (rather than a battery), the tag's useful life may be extremely long (because there is no battery to maintain). The capacity of the storage capacitor may limit how long the tag can effectively respond. When the capacitor is discharged, the tag may have less range than when fully charged.

Discussed herein is an adaptive reader system that can learn how long the RFID tag takes to charge up. Some RFID tags may charge up relatively quickly and can be accessed frequently. Others may not charge as quickly, but in some cases, readings can be done at much longer intervals allowing the tag a long time to gather enough energy to complete the transaction. Once the reader learned the charge times of an array of sensor tags, its antenna could be positioned to maximize the signal delivered to tags that took a long time energy harvesting, and they could be positioned further from tags that could charge up quickly As an example, consider a facility with an array of energy harvesting sensor tags. At installation, the reader would attempt to interrogate a tag after a short period of time and gradually increase this time until it can hear the RFID tag's response. This response window is characteristic of the RFID tag in its environment. Each RFID tag's ability to gather energy can be different, so it is important that the RFID reader be able to adapt to this variation in characteristic time between RFID tag accesses. By measuring the time that it takes the RFID tag to charge up, the RFID reader "learns" how often it should query a particular RFID tag. Then the RFID reader may adjust its querying pattern, giving each RFID tag enough time to recharge. As a result, the RFID system does not need to transmit RF continuously and queries the tags only as needed, when the RFID tags are charged up and ready to respond.

As another option that can be used in conjunction with the changing the query interval of the tags, once the tag environment is known, the RFID reader can adjust the antenna pattern to provide less signal to the tags in a better environment and more signal to the tags in a worse environment.

The drawings below provide further details of exemplary embodiments of the present application.

Figure 1:
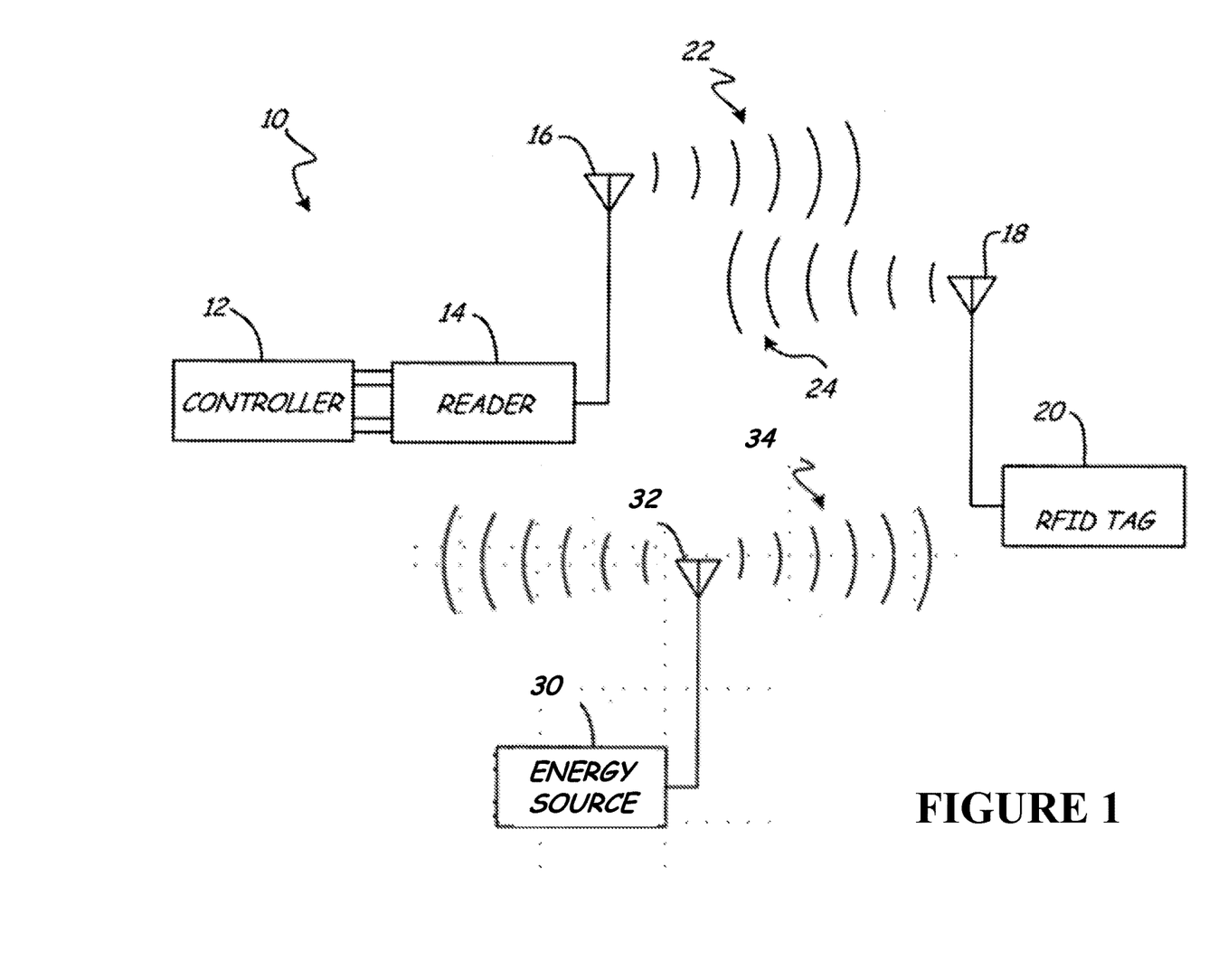
FIG. 1 is a block diagram illustrating communication between a radio frequency identification (RFID) reader and RFID tag according to an embodiment.

FIG. 1 is a block diagram illustrating an exemplary embodiment of an RFID communication system 10, which includes controller 12, RFID reader 14, reader antenna 16, tag antenna 18, and passive RFID tag 20. In this exemplary embodiment, RFID tag 20 may be a passive tag, powered by power 34 transmitted by energy source 30 reader antenna 32 (and/or power from antenna 16) to supply power to systems on-board RFID tag 20 and to generate a signal 24 for transmission to reader antenna 16 when receiving an inquiry signal from RFID reader 14.

In an exemplary embodiment, controller 12 (e.g., personal computer, handheld device, etc.) instructs RFID reader 14 to generate transmission signal 22, which serves to interrogate local RFID tags. The transmission signal generated by reader 14 and provided to antenna 16 for communication may be typically an ultra high-frequency signal (i.e., carrier frequency), operating in an assigned frequency ranges (e.g., within 860-960 MegaHertz (MHz), depending on the country). In the embodiment shown in FIG. 1, reader antenna 16 acts as both a transmitting antenna and a receiving antenna. That is, reader antenna 16 transmits the high-frequency transmission signal 22 at the request of controller 12 and reader 14, and also acts to receive backscattered signals 24 provided by interrogated RFID tags. In other embodiments, a separate transmission antenna and receiver antenna may be employed.

With respect to passive RFID devices, interrogation of each RFID tag occurs with tag antenna 18 receiving a transmission signal generated by reader antenna 16. Power received by tag antenna 18 from energy source 30 is rectified and used to power systems employed by RFID tag 20. In addition, a portion of the transmitted signal is reflected back towards reader antenna 16. This reflection from RFID tag 20 is referred to herein as the backscattered signal. Data or information stored by RFID tag 20 is transmitted back to RFID reader antenna 16 by modulating the backscattered signal 24. In an exemplary embodiment, RFID tag 20 modulates backscattered signal 24 by selectively varying the impedance associated with tag antenna 18. This may include varying the real impedance associated with tag antenna 18, the reactive impedance associated with tag antenna 18, or a combination thereof.

Reader antenna 16 receives backscattered signal 24. In the exemplary embodiment illustrated in FIG. 1, reader antenna 16 also serves as the receiving antenna for RFID reader 14. In other embodiments, RFID reader 14 may include separate antennas for transmitting and receiving signals. The backscattered signal 24 captured by reader antenna 16 is provided to RFID reader 14 for demodulation and detection of data provided by the interrogated RFID tag.

The RFID tag may be a passive or active RFID tag and may harvest energy from an energy source 30. The RFID tag harvests the power from energy source by storing power in a storage section of the RFID tag. The storage section of the RFID tag may include at least one capacitor, at least one supercapacitor, a rechargeable battery, or any other device which can hold electrical power.

The energy source 30 is separate from the RFID reader and may include an antenna 32 and may be configured to output a continuous power signal to multiple power sources. The energy source 30 may continuously recharge the RFID tag and may occur while the RFID reader sends interrogation signals to the RFID tag.

Figure 2:
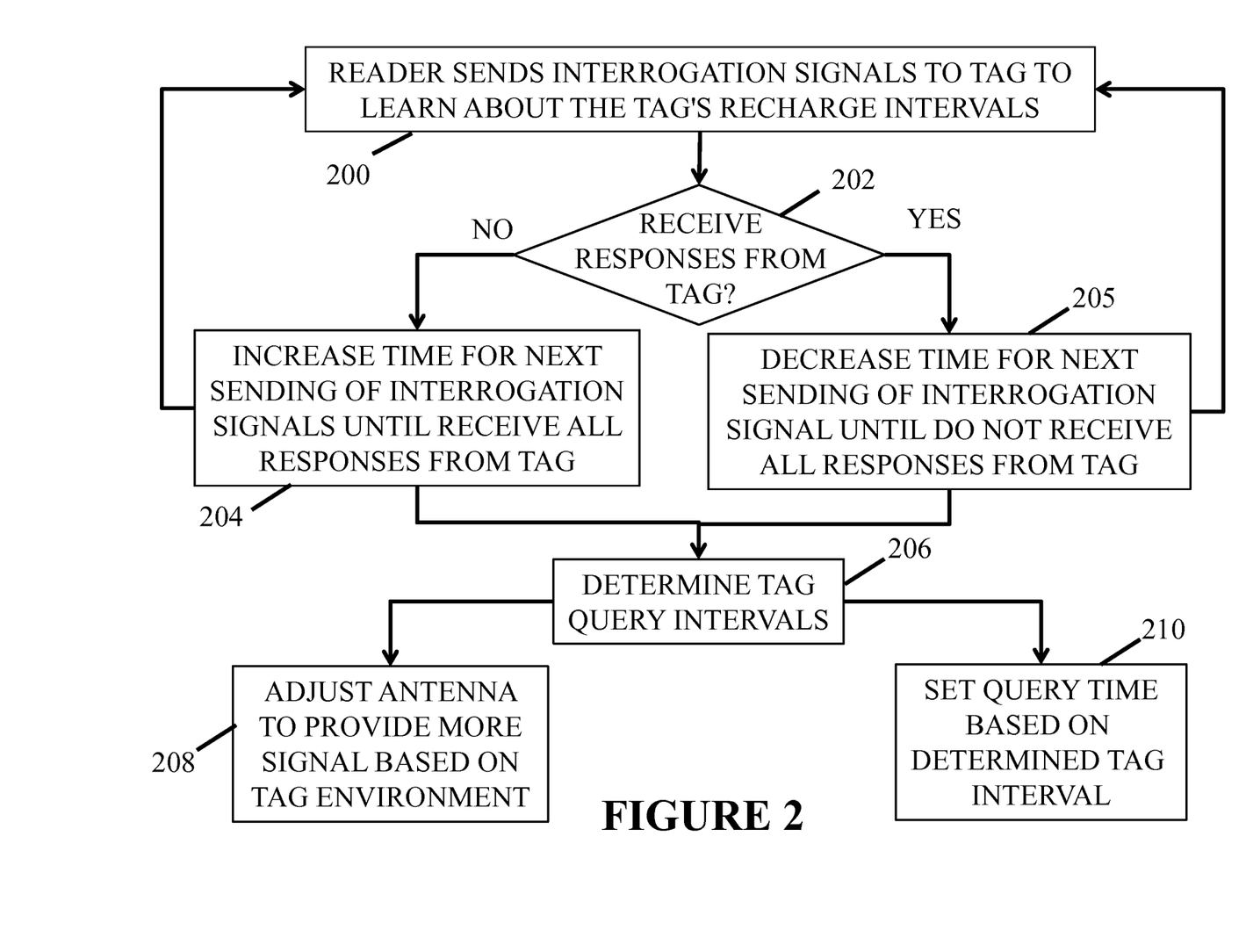
FIG. 2 is a schematic diagram of a method of operating a smart RFID reader according to an embodiment.

FIG. 2 is a schematic diagram of a method of operating a smart RFID reader according to an embodiment. The RFID tag may be continuously harvesting energy from the energy source including while any of blocks 200-210 occur. As shown in FIG. 2, at block 200, the RFID reader may continuously and periodically send interrogation signals to the RFID tag at a first time interval in order to learn the RFID tag's recharge intervals.

At block 202, the RFID reader determines if responses from the RFID tag are received by the RFID reader for all of the interrogation signals. For example, if the RFID reader sends out ten (10) interrogation signals in a first time interval, the RFID reader receiving a response from all ten of the interrogation signals would result in a "Yes" to block 202; otherwise, the answer received may be a "No," including even if the amount of responses received at the RFID reader is 2, 6, or 9 responses in the first time interval to the 10 interrogation signals.

The answer is "No" in block 202, the RFID reader increases the first time interval for sending the next interrogation signal, as provided by block 204 to decrease the frequency of the interrogation signals. In this regard, the method may return to block 200 and send interrogation signals at the new increased first time interval. The method may then continue through steps 200-204 to gradually increase the first time interval until the RFID reader receives a response from the RFID tag to each corresponding interrogation signal. Once each individual tag can be heard by the reader, the RFID reader would record the time duration for each individual tag and the time each individual tag takes to recharge. Thus, the first time interval is increased which decreases the frequency the RFID reader sends the interrogational signal to the RFID tag.

On the other hand, in block 205, if the RFID reader determines responses from the RFID tag is received by the RFID reader to each corresponding interrogation signal (e.g., all responses to all interrogation signals sent by the RFID reader in the first time interval are received by the RFID reader), the RFID reader may decrease the time for sending the next interrogation signal until the RFID reader does not receive at least one response to an interrogation signal from the RFID tag. This allows the RFID reader to determine if the frequency of the interrogation signals could be increased (since the RFID tag can respond quicker than the current first time interval). Thus, the first time interval is decreased which increases the frequency the RFID reader sends the interrogational signal to the RFID tag.

The controller then determines the minimum tag query intervals at block 206 for each RFID tag using the data received from blocks 200-205. Based on the tag query interval, the controller determines the maximum frequency with which each corresponding RFID tag can respond to the RFID reader interrogation signals (based on the harvesting from energy sources). At this point, the controller can set the query time interval of the interrogation signals of the RFID reader at block 210 (this interval would correspond to any interrogation frequency from zero to the determined maximum frequency). This may be any frequency from zero to the determined minimum frequency. In one embodiment, the controller sets the query time interval between sending the interrogation signals of the RFID reader to the determined maximum time interval.

Figure 3:
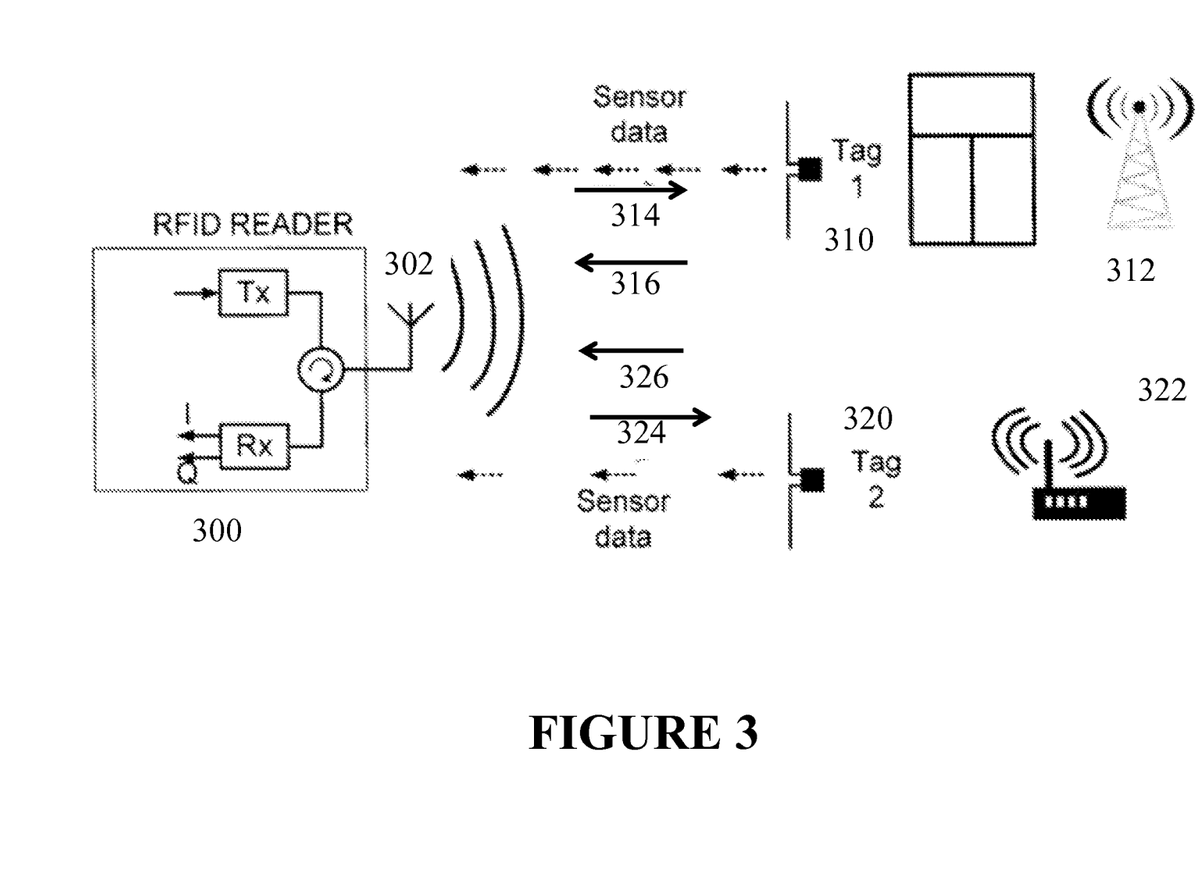
FIG. 3 is a block diagram of a smart RFID reader system according to an embodiment.

FIG. 3 is a block diagram of a smart RFID reader system according to an embodiment. The smart RFID reader system, as shown in FIG. 3, includes RFID reader 300 with adaptive antenna 302 wirelessly communicating with at least one RFID tag 310, 320. The RFID tags 310, 320 harvest power from external power sources 312, 322, respectively, through at least one internal capacitor (or other source harvesting component) on the tag. In one embodiment, the RFID tags harvest power only from one or more external power sources, and thus, not from RFID reader.

As the illustrative example shows in FIG. 3, two RFID tags 310, 320 are shown, but it should be known that a plurality of RFID tags can be used. RFID tag 310 is located at a window and in close proximity to source 312 and thus, is able to harvest energy quickly from energy source 312 for charging the capacitor (RFID tag 310 does not harvest energy from 322). On the other hand, RFID tag 320 harvests less from the energy source 322 (as compared with RFID tag 310 and source 312) for charging the capacitor and thus, does not charge as fast as RFID tag 310. In this regard, as shown in FIG. 3, RFID tag 310 responds to all interrogation signals which are sent with a short time interval between interrogation signals (i.e., higher interrogation signal frequency) as compared with RFID tag 320. Also shown in FIG. 3 is that RFID tag 320 requires a longer time interval between interrogation signals (i.e., lower interrogation signal frequency) because RFID tag 320 has a slower recharge time than RFID tag 310.

RFID reader 300 sends signals (e.g., interrogation signals) to RFID tag 310 using antenna 302 using data channel 314 in order to learn the charging intervals of RFID tags 310 and 320. RFID reader 300 receives information from RFID tag 310 through channel 316. The RFID reader 300 is able to send information to RFID tag 320 using RFID antenna 302 using data channel 324. RFID reader 300 receives information from RFID tag 320 through channel 326.

RFID tag 310 recharges quicker due to harvesting more energy than RFID tag 320. Initially, RFID reader 300 transmits interrogation signals at a first frequency through antenna 302 through channels 314 and 324. By example since RFID tag 310 is charges quickly due to its charging environment relative to source 312, it is able to receive the interrogation signal from the RFID reader and responds through channel 316 so that reader 300 receives the response. RFID tag 320 is not able to respond to the RFID reader's interrogation signal at the same frequency because it is not able to recharge at the same interval as the interrogation signals. RFID reader 300 increases the length of time for the signal 324 until RFID tag 320 is able to recharge and respond with signal 326. Reader 300 records the length of signal time to respond to the RFID reader's interrogation signal for RFID tag 310 and RFID tag 320. This information is used to determine the query interval.

Figure 4:
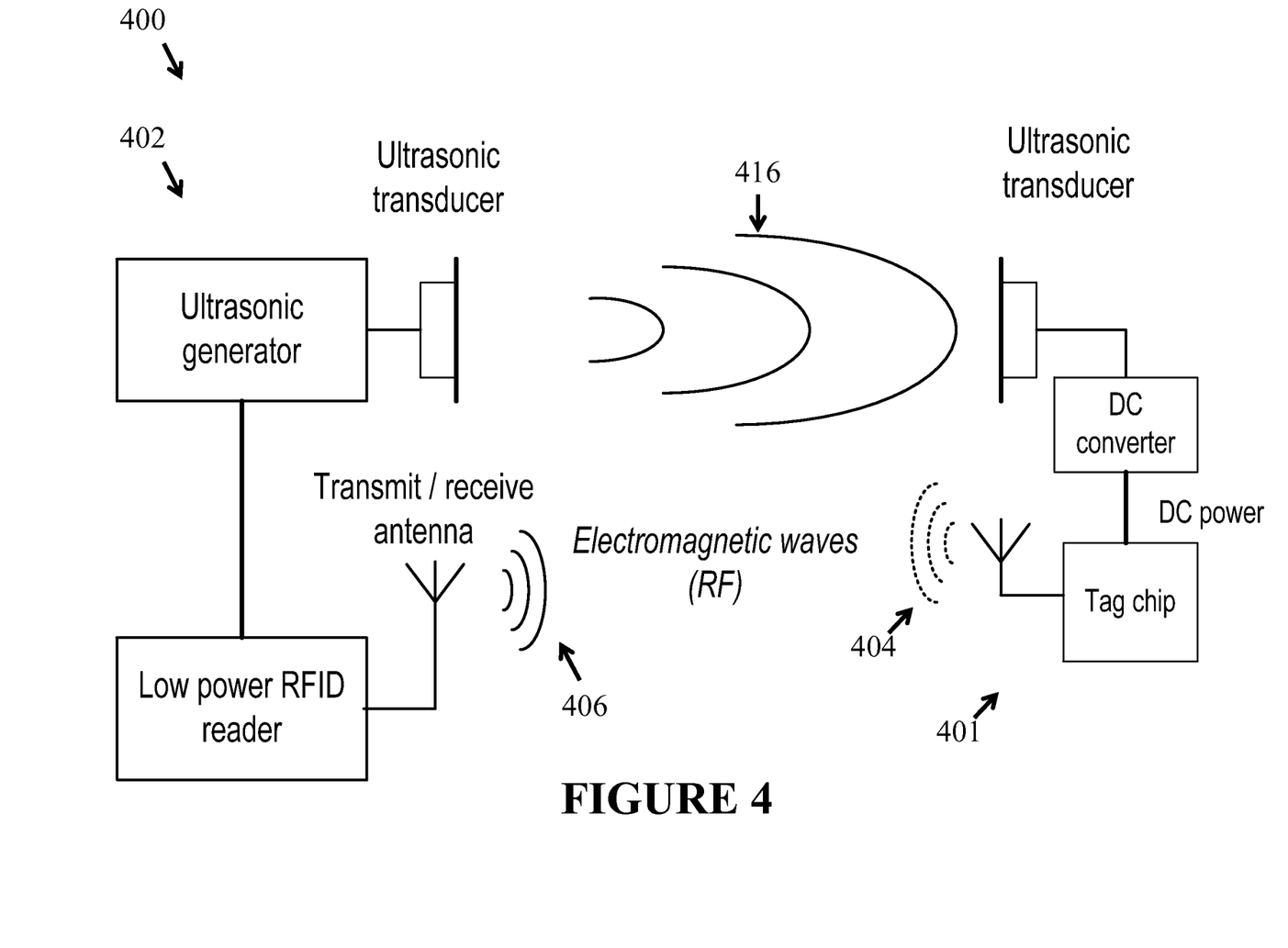
FIG. 4 is a block diagram of an RFID system with ultrasonic powering and RF backscatter.

FIG. 4 is a block diagram of an RFID system 400 with ultrasonic powering and RF backscatter. To power the RFID tag 401, the RFID reader 402 may include an ultrasonic generator that can generate ultrasonic waves 416. The RFID reader 402 may also include an antenna to transmit electromagnetic low power signals 406. The RFID tag 401 then may receive the low power RF signals 406 from the RFID reader 402 and respond to the low power RF signal 406 using backscatter 404 while the RFID tag 401 is powered using harvested power from the ultrasonic waves 416. The RF signal 406 is provided for backscatter only, not for powering up the tag.

Necessity to transmit enough RF power to energize passive RFID tags is the main factor that limits a passive tag range. This also means that the RFID reader needs to use high power transmitter (e.g., 1 W) and high gain antenna in order to maximize tag range. If the RFID reader 402 needs to provide only low power RF (for tag backscatter only) and thus it can be low power, with small antenna, potentially even integrated into mobile handheld computer.

One advantage of using ultrasonic waves to power RFID tags is that they can penetrate through materials of various materials, including dense materials or even devices with metal. Accordingly, tags can be read in poor RF environments (i.e., near metal, inside boxes with various materials, etc.).

Many UHF RFID readers (both fixed and handheld) need to use high power radio and high gain antennas to provide enough power to power passive RFID tags. It may be advantageous to power the RFID tag by a non-RF energy source that is provided by the RFID reader itself. This allows the RFID tag to be independent on batteries or on external energy sources, such as TV/radio towers etc. which are not available everywhere.

Another potential advantage of an RFID reader outputting ultrasound waves to power RFID tags is the small size of the transducer. Ultrasound waves are mechanical waves, so the wavelength is small (e.g., for 3.3 MHz ultrasound, the wavelength of ultrasonic waves are 0.1 mm in air, which is much lower than the wavelength of electromagnetic waves in the UHF RFID band which is 0.33 m at 909 MHz).

The RFID reader may include an ultrasonic transducer to send ultrasonic waves and the RFID tags may include ultrasonic transducer to harvest the sent ultrasonic waves. The ultrasonic transducer may be a device that converts one from of energy into another, e.g. electromagnetic energy to electrical energy. One example of the ultrasonic transducer that may be employed is a 40 KHz ultrasonic transducer by Acroname Robotics. The ultrasonic transducer may be efficient only if its size is much larger than the received wavelength of the ultrasonic waves. However, in the ultrasonic domain, the absolute size of the efficient transducer can be very small compared to UHF RF domain.

As mentioned above (with regard to the discussion of FIG. 4), the RFID tag is powered by the RFID reader using a transducer that is separate from the RF antenna. This allows the RF signal that is provided by the reader to be low power, for backscatter only, not for powering tag up.

In some ultrasonic systems, distances up to ten feet in free space the power of about −15 dBm can be easily delivered, which is enough to power an average RFID tag.

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims. Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. An RFID reader comprising:
   an antenna that sends, at first time intervals, interrogation signals to an RFID tag that harvests energy from a source other than the RFID reader;
   a controller that:
   identifies responses received from the RFID tag in response to the interrogation signals sent to the RFID tag, in response to a determination that the RFID tag did not respond to at least one of the interrogation signals, the controller increases the first time interval to a second time interval;

sets an interrogation signal interval of the RFID reader to the second time interval so that the interrogation signals are sent at the second time intervals.

2. The RFID reader of claim 1, wherein the controller determines if the RFID tag has responded to each of the interrogation signals sent by the RFID reader.

3. The RFID reader of claim 2, wherein the controller increases the first time interval to a third time interval so that the interrogation signals sent to the RFID tag are sent at a higher frequency.

4. The RFID reader of claim 3, wherein the controller sets the interrogation time interval as the first time interval.

5. The RFID reader of claim 1, wherein the sources other than the RFID reader comprises an energy source from an antenna separate from the RFID reader.

6. The RFID reader of claim 1, wherein the sources other than the RFID reader comprises a transducer producing an ultrasonic wave.

7. An RFID reader comprising:

an antenna that sends, at first time intervals, interrogation signals to an RFID tag that harvests energy from a source other than the RFID reader;

a controller that:

identifies responses received from the RFID tag in response to the interrogation signals sent to the RFID tag, in response to a determination that the RFID tag responded to all of the interrogation signals, the controller decreases the first time interval to a second time interval;

sets an interrogation signal interval of the RFID reader to the second time interval so that the interrogation signals are sent at the second time intervals.

8. The RFID reader of claim 7, wherein the controller determines if the RFID tag has not responded to each of the interrogation signals sent by the RFID reader using the second time interval.

9. The RFID reader of claim 8, wherein the controller increases the first time interval to a third time interval so that the interrogation signals sent to the RFID tag are sent at a lower frequency.

10. The RFID reader of claim 8, wherein the controller sets the interrogation time interval as the first time interval in response to the controller determining that the RFID tag has not responded to each of the interrogation signals sent by the RFID reader using the second time interval.

11. The RFID reader of claim 8, wherein the controller sets the interrogation time interval as the second time interval in response to the controller determining that the RFID tag has responded to each of the interrogation signals sent by the RFID reader using the second time interval.

* * * * *